Feb. 11, 1941.  A. NEIMAN  2,231,546
ANTITHEFT LOCK FOR BICYCLES
Filed Feb. 8, 1938
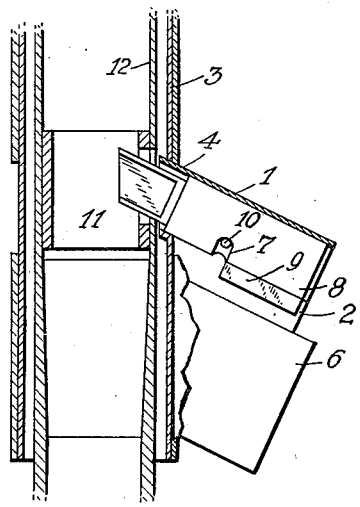
Fig. 1
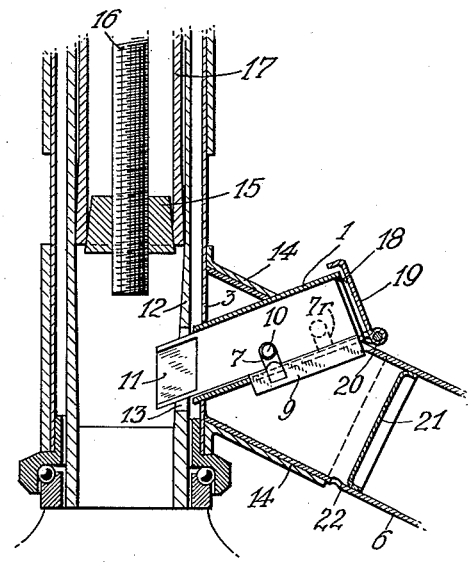
Fig. 2
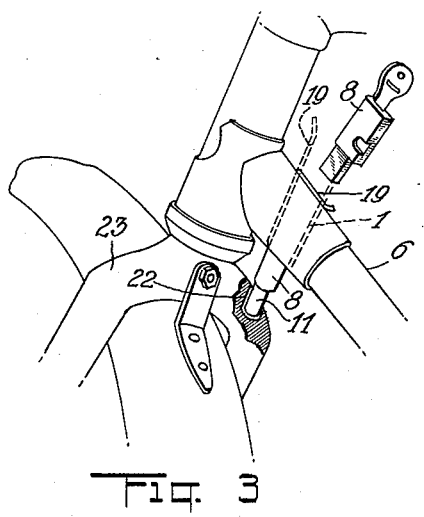
Fig. 3
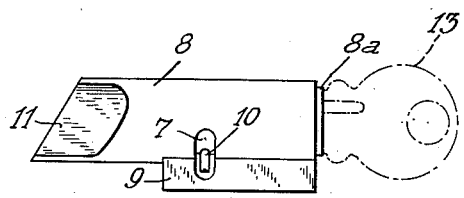
Fig. 4
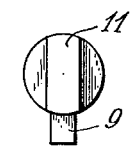
Fig. 5
INVENTOR.
ABRAM NEIMAN
BY
ATTORNEY.

Patented Feb. 11, 1941

2,231,546

UNITED STATES PATENT OFFICE 2,231,546

ANTITHEFT LOCK FOR BICYCLES

Abram Neiman, Paris, France

Application February 8, 1938, Serial No. 189,320
In Germany February 16, 1937

5 Claims. (Cl. 70—233)

This invention relates to antitheft locking devices for vehicles, more particularly of the kind comprising a lock or barrel which can be withdrawn together with the key, thus leaving only an empty lock casing permanently connected with the vehicle.

One object of the invention is to provide an antitheft device of this kind adapted for use in connection with bicycles.

Another object is to provide a bicycle to which the permanent part or parts of the antitheft device is or are secured in a particularly advantageous manner.

In connection with motor cycles, antitheft devices have already been proposed comprising a lock with a withdrawable body or barrel provided with a fixed, guiding rib and a slidable or otherwise movable locking projection as well as a lock casing having a longitudinal guiding slot and a transversal locking slot, which slots co-operate with the two projections on the barrel. Without exceptions, the lock casing has been arranged in the middle of the steering-head tube of the frame of the motor cycle so that the front end of the barrel, when inserted, engages a recess provided in the steering column, thus preventing the use of the vehicle. It has also been proposed to lock the handle-bar shaft to the frame of the motor cycle directly.

The present invention is based on the view that the essential advantages of antitheft devices using the kind of withdrawable lock barrels as explained above cannot be retained, in an application to bicycles, unless the arrangement of the lock casing is adapted to the peculiarities of the conventional design of these vehicles. An arrangement in the middle of the steering-head tube of the frame, as used in the case of motor cycles, is obviously not possible in the case of bicycles, where that tube accommodates not only the steering column, but also the handle-bar shaft and the cone and the rod for the relative adjustment and the connection of these two shafts. A perforation of these parts large enough for the reception of the bolt portion of the lock barrel would dangerously weaken them, and would make their further adjustability with regard to each other a very difficult problem. Locking of the handle bar or the handle-bar shaft to the frame, as also proposed in the case of motor cycles, is not possible in the case of bicycles, where the height of the handle bar must remain adjustable to the individual cyclists.

These remarks make it obvious that the arrangements proposed in connection with motor cycles cannot be applied to bicycles, quite apart from the fact that the motor cycle locks so far produced are far too heavy and cumbersome for as light a vehicle as a bicycle.

According to the present invention I also utilize a lock of the withdrawable type comprising a barrel or body provided with at least one guiding rib or projection and one, two, or even more slidable or otherwise movable locking projections and a front portion adapted to act as the bolt of the lock. The barrel fits in a permanently fixed lock casing provided with a guiding slot or recess and with one or more locking slots or recesses corresponding to the locking projection or projections of the barrel. The distinguishing feature of my invention consists, however, in that the lock casing is not secured to the middle portion of the steering-head tube of the bicycle or to the middle portion of any other of the frame tubes thereof, but is permanently secured to the juncture of two frame tubes and at least partly sunk in the frame tubing in the vicinity of a part of the bicycle which is normally movable in relation to that juncture and which, when immobilized by the lock, prevents the use of the bicycle.

Where the tubes of the bicycle frame are joined together by means of sockets or similar fittings, the weakening of the frame due to the insertion of the lock casing is either negligible or else can easily be allowed for by choosing a stronger socket. As a rule, the lock casing can, however, easily be arranged to serve as an additional reinforcement or stay for the tube juncture, a fact which is particularly important in the case of tube frames joined together by welding without resorting to sockets or similar fittings.

These tube junctures also provide comparatively large empty spaces which facilitate the accommodation of the lock casing, in a partly or entirely sunken arrangement, which gives the bicycle a normal and therefore desirable appearance.

Finally, most of the vital movable parts of a bicycle approach closely one or the other of the tube junctures, whereby the locking thereof is greatly facilitated.

A position particularly advantageous for the arrangement of the lock casing is the juncture of the steering-head tube and the downward or bottom tube of a bicycle frame, because this juncture, particularly in cases where there are no sockets or fittings, can easily be reinforced by the locking case itself, by arranging it diagonally or obliquely with regard to that juncture. Such a position is further advantageous in that the plane of the aperture of the lock casing becomes vertical or nearly so, whereby the entering of dust, mud or rain becomes less likely. If desired, the arrangement may, however, be supplemented by a hinged cap for that aperture, preferably a spring-actuated one which closes automatically on withdrawing the barrel of the lock from the casing.

Another advantage of the arrangement of the lock casing at this particular juncture is its easy accessability which facilitates the insertion and the withdrawal of the key regardless of the height of the steering head. Furthermore, it will be noted that the front portion of the barrel of the lock, which serves as the bolt of the lock, remains clear of the handle-bar shaft and its cone and adjusting rod, and that it enters the lower portion of the steering column which, according to the conventional design, is thicker and stronger than the middle or the upper portion thereof. So strong is this part that even a powerful effort to force the lock will cause neither bending nor tearing of the rims of the aperture or slot receiving the bolt end of the barrel, particularly if that end is not circular in cross section, but has flattened sides so as to distribute the pressing force over a wider area. In addition thereto, the rims of the aperture in the steering column may be bent over in order to provide an additional re-inforcement.

I consider a sunken arrangement of the locking case in the juncture of the steering-head tube and the bottom tube as a particularly advantageous embodiment of my invention, but the latter is, of course, not limited thereto. In some cases, another tube juncture may be found to be more desirable, or the locking of movable parts of the bicycle other than the steering column may be provided for. One modification of my invention, to which I will refer in greater detail further below, provides for the bolt portion of the barrel to enter a thimble-shaped recess in the upper surface of the fork crown of the bicycle, while the lock casing is transversely inserted in the end portion of the lower or bottom tube of the frame.

In the drawing, my invention is further illustrated by way of example only.

Fig. 1 is a sectional elevation of the juncture of the steering-head tube and the bottom tube of a bicycle, the steering column being locked by the new antitheft device.

Fig. 2 is a sectional elevation similar to that shown in Fig. 1, with the new device arranged to serve as a re-inforcement of the tubing in which it is sunk.

Fig. 3 is a perspective view, partly in section, of the front portion of a bicycle with the new device arranged to immobilize the fork crown; and, detached, the lock barrel with the key.

Fig. 4 is a detailed elevational view of an embodiment of the removable locking device to be used in connection with the antitheft apparatus according to the invention;

Fig. 5 is an end view corresponding to Fig. 4.

In Fig. 1, the lock casing 1, which is produced from sheet steel by stamping and bending, and which has the shape of a cylinder with two adjoining lateral flanges 2, is partly inserted in, and welded or brazed within, an aperture 4 in the steering-head tube 3, along a line parallel to its obliquely cut upper end 5. It is also welded or brazed to the outside of the bottom tube 6 of the bicycle frame along the rims of the flanges, and contains a longitudinal guiding recess and a transverse locking recess or groove 7. The locking barrel (see also Figs. 4 and 5) includes an outer part 8 carrying a longitudinal guiding projection 9, so as to be longitudinally slidable in the lock casing, designated by reference numeral 1. Inside this outer part 8, there is an inner part 8a, rotatable therein under the effect of key 13. This inner part carries a locking projection 10 fitting movably in a corresponding aperture 7 of the outer part 8 in such manner that, for one angular position of key 13, projection 10 is located wholly on the inside of aperture 7, thus permitting barrel 8 to slide longitudinally in its casing 1, while, for another position of key 13, piece 10 projects from said aperture 7 and can engage the locking recess of casing 1, thus preventing barrel 8 from moving longitudinally with respect to casing 1. The frontal or bolt end 11 of the barrel, which is laterally flattened, enters a slot 13 in the steering column 12, thereby locking the latter and preventing any steering motion. For obvious reasons the slot in the steering column is arranged at a point corresponding to a sharp side turning of the front wheel of the bicycle.

Fig. 2 shows an arrangement according to which the lock casing 1 is sunk obliquely in the socketed juncture of the steering-head tube 3 and the bottom tube 6 of the bicycle frame. It will be noted that the flat-sided bolt portion 11 of the barrel 8 engages a slot 13 in the lower and thicker end of the steering column 12 and consequently remains clear of the cone 15 and the adjusting rod 16 of the handle-bar shaft 17. The upper aperture 18 of the lock casing 1 is in a nearly vertical plane and also covered by a lid 19 which is hinged to an extension 20 of the lock casing 1 and, is electrically mounted so as to close said aperture 18 whenever the key is not inserted. Furthermore, in order to prevent any accidentally admitted rainwater from penetrating through the bottom tube 6 to the pedal bearing or bracket at the other end of that tube, a resilient closure plate 21 is arranged inside that tube just below a little drainage hole 22. In this embodiment, the lock casing 1 is provided with a second locking recess, shown in dotted lines at r, on the right hand, or outer, side of the first mentioned locking recess and at such a distance therefrom that, when locking projection 10 is engaged in locking recess r, the barrel is locked in the lock casing, but its end 11 is no longer engaged in slot 13 so that the bicycle is not immobilized. The structure of the locking device is exactly the same as above described with reference to Figs. 4 and 5 and the end 11 is flattened on its both sides, the advantage of said flattening being to considerably increase the bearing surface of the parts 11 against the wall of the slot 13 in which end 11 is engaged, whereby the resistance against shearing effort is likely increased.

In Figure 3 the lock casing 1, which is also protected by a spring hinged lid 19, engages into the upper or juncture end of the bottom tube 6 of the bicycle frame so that the bolt end 11 of the barrel 8, when inserted, may engage a recess 13 provided in the fork crown 23. Again, the relative positions of the lock casing 1 and the recess 22 for the bolt 11 enable the bicycle to be immobilized with the steering head and the front wheel sharply turned to one side.

I claim:

1. An antitheft lock for use in connection with bicycles comprising a withdrawable barrel having at least one fixed guiding projection and at least one retractable locking projection adapted to be operated by a key, and a lock casing provided with at least one guiding recess adapted to cooperate with said guiding projection and at least one locking recess adapted to cooperate with said locking projection, said lock casing being permanently secured to the frame of the bicycle at a juncture of frame tubes and at least partly sunk in the frame tubing in a position where the barrel, when inserted, locks a movable bicycle part and thereby prevents the use of the bicycle.

2. An antitheft lock for use in connection with bicycles comprising a withdrawable barrel having at least one fixed guiding projection and at least one retractable locking projection adapted to be operated by a key, and a lock casing provided with at least one guiding recess adapted to cooperate with said guiding projection and at least one locking recess adapted to cooperate with said locking projection, said lock casing being permanently secured to the frame of the bicycle at a juncture of frame tubes and at least partly sunk in the frame tubing in a position where it serves as an additional re-inforcement of said juncture and where the barrel, when inserted, locks a movable bicycle part and thereby prevents the use of the bicycle.

3. An antitheft lock for use in connection with bicycles comprising a withdrawable barrel having at least one fixed guiding projection and at least one retracable locking projection adapted to be operated by a key, and a lock casing provided with at least one guiding recess adapted to cooperate with said guiding projection and at least one locking recess adapted to cooperate with said locking projection, said lock casing being premanently secured to, and at least partly sunk in, the frame of the bicycle at the juncture of the steering-head tube and the bottom tube of the bicycle frame in a position where the barrel, when inserted, projects into a recess in the steering column and thereby immobilizes the latter.

4. An antitheft lock for use in connection with bicycles comprising a withdrawable barrel having at least one longitudinal guiding projection and one retractable locking projection adapted to be operated by a key, and a lock casing provided with a longitudinal guiding recess adapted to cooperate with said guiding projection and at least two transversal recesses capable of being alternatively engaged by said locking projection, said lock casing being permanently secured to the frame of the bicycle at a juncture of frame tubes and at least partly sunk in the frame tubing in a position where the barrel, when fully inserted so that the said locking projection engages the one of said transversal recesses, locks a movable bicycle part and thereby prevents the use of the bicycle, while the same barrel, when only partly inserted so that the said locking projection engages the other of said transversal recesses, only locks itself without immobilizing the bicycle.

5. An antitheft locking device for use in connection with a bicycle which comprises, in combination, a cylindrical casing permanently secured to the frame of the bicycle at a juncture of the frame tubes thereof and at least partly sunk in at least one of said tubes, a barrel adapted to fit in said casing so as to be longitudinally slidable therein without being able to turn therein, said casing being so positioned that said barrel when fully engaged therein locks a movable bicycle part and thereby prevents the use of the bicycle, and means for locking said barrel longitudinally with respect to said casing at least when fully engaged therein.

ABRAM NEIMAN.